Nov. 9, 1971  G. BATTIGALLI  3,618,209
DRIVE SYSTEM FOR CONTROLLING MOTION OF THE SHAVING
ELEMENTS OF AN ELECTRIC SHAVER
Filed March 7, 1969  4 Sheets-Sheet 1

GIANCARLO BATTIGALLI
INVENTOR

*Finnegan, Henderson & Farabow*
ATTORNEYS

Nov. 9, 1971  G. BATTIGALLI  3,618,209
DRIVE SYSTEM FOR CONTROLLING MOTION OF THE SHAVING
ELEMENTS OF AN ELECTRIC SHAVER
Filed March 7, 1969  4 Sheets-Sheet 2

GIANCARLO BATTIGALLI
INVENTOR

*Finnegan, Henderson & Farabow*
ATTORNEYS

Nov. 9, 1971 G. BATTIGALLI 3,618,209
DRIVE SYSTEM FOR CONTROLLING MOTION OF THE SHAVING
ELEMENTS OF AN ELECTRIC SHAVER
Filed March 7, 1969 4 Sheets-Sheet 3
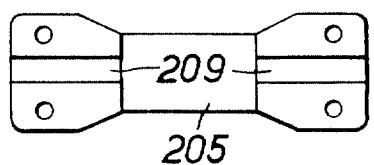
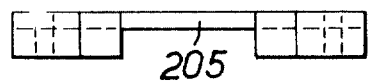
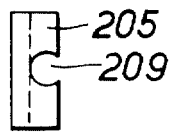
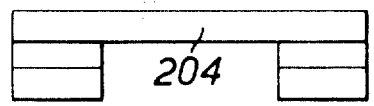
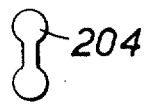
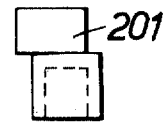
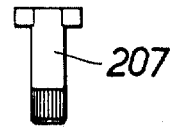
GIANCARLO BATTIGALLI
INVENTOR
*Finnegan, Henderson & Farabow*
ATTORNEYS

United States Patent Office 3,618,209
Patented Nov. 9, 1971

3,618,209
DRIVE SYSTEM FOR CONTROLLING MOTION OF THE SHAVING ELEMENTS OF AN ELECTRIC SHAVER
Giancarlo Battigalli, Milan, Italy, assignor to Mistrelettrica S.R.L., Milan, Italy
Filed Mar. 7, 1969, Ser. No. 805,172
Claims priority, application Italy, Mar. 8, 1968,
A 13,694/68
Int. Cl. B26b 19/26
U.S. Cl. 30—43.3
5 Claims

ABSTRACT OF THE DISCLOSURE

A drive system for controlling the motion of the shaving elements of an electric shaver, consisting of a mechanical oscillator unit operating as an articulated parallelogram.

BACKGROUND OF THE INVENTION

The present invention relates to a drive system for controlling the motion of the shaving elements of an electric shaver.

In the design of an electric shaver with rotary motor, there is the problem of providing a drive system for transforming the rotary motion of the drive shaft into a swinging motion of the shaving elements, when the latter are of the comb and blade type.

The problem is solved with eccentrics, gears, linkages, but the motion of the blades is still not satisfactory, often being a simple reciprocating motion so that the user has to move continuously the shaver, resulting in a long and imperfect shaving operation.

SUMMARY OF THE INVENTION

An object of the present invention is to provide a drive system for controlling the motion of the shaving elements of an electric shaver, effecting said transformation of the motion in a simple way with a minimum energy consumption.

Another object of the present invention is to provide a drive system of the aforementioned kind wherein the shaving elements are moved through a mechanical oscillator unit.

Another object of the present invention is to provide a drive system of the aforementioned kind wherein the mechanical oscillator unit is operating as an articulated prallelogram.

BRIEF DESCRIPTION OF THE DRAWINGS

The components, features, advantages, objects and manufacturing techniques of the drive system according to the present invention are hereinafter described in detail in one preferred embodiment thereof, given by way of non-limiting example only, with reference to the accompanying drawings, in which:

FIGS. 6, 7 and 8 are plan, lateral and end views, respectively, of one of the supporting hinges;

FIGS. 9 and 10 are side and front views, respectively, of one of the swinging arms;

FIGS. 11 and 12 are top plan and side views, respectively, of the eccentric cam connecting the drive system to the drive shaft of the shaver electric motor;

FIGS. 13 and 14 are side and top plan views, respectively, of one of the T-shaped pins for connecting the swinging plate to the shaving elements of the shaver.

DETAILED DESCRIPTION OF THE PREFERRED EMBODIMENT

Figure 4:
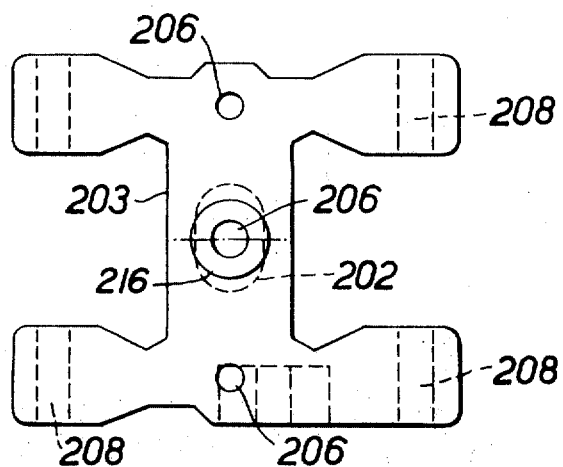
FIG. 4 is a plan view of the swinging plate.
Figure 15:
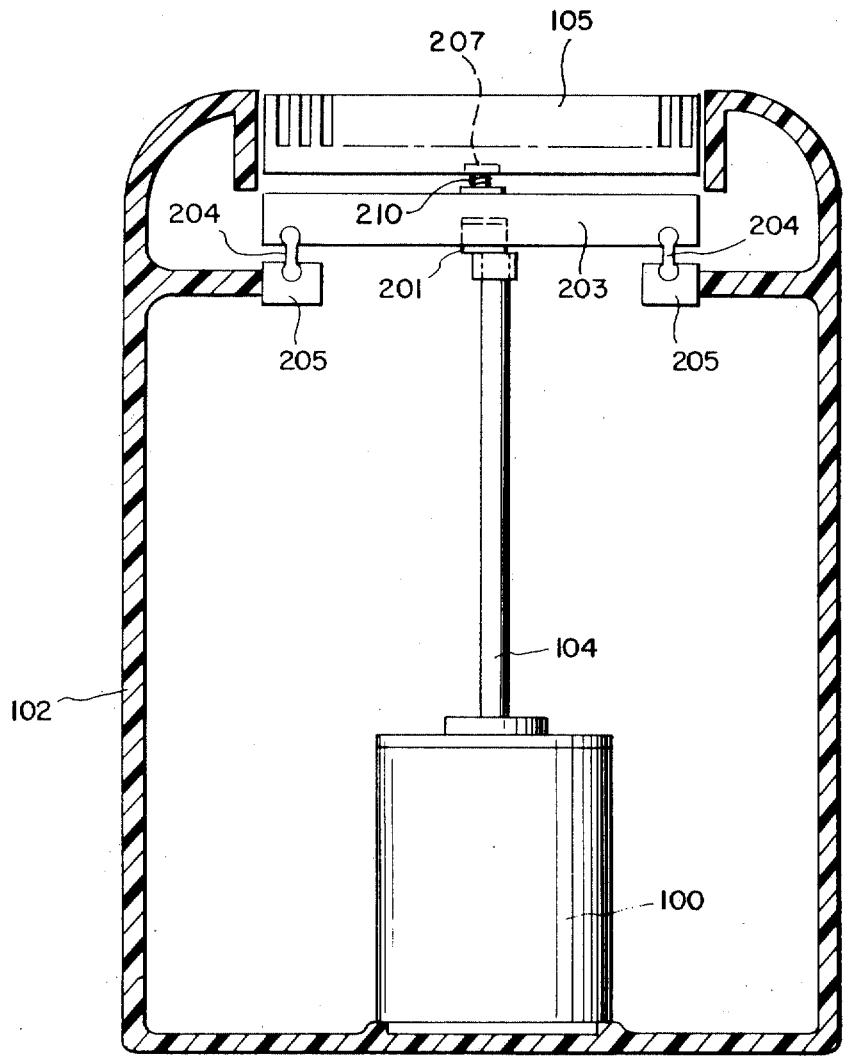
FIG. 15 illustrates a shaver incorporating the drive system of the present invention.

Referring to FIG. 15, an electric motor 100 is mounted in housing 102 of the shaver in a vertical position; on the free end of its drive shaft 104 an eccentric cam 201 (FIGS. 11 and 12) is keyed. During motion of the drive shaft said cam 201 slides in a suitable recess 202 of a swinging plate 203 which will be described in detail with reference to FIG. 4. The recess 202 has the form of a hollow parallelepiped with long sides at right angles to the shaving elements.

The eccentric is always in sliding contact with the flat surface of the recess made in the swinging plate. During a complete revolution of drive shaft, the swinging plate has two dead centers or standstill moments.

Figure 2:
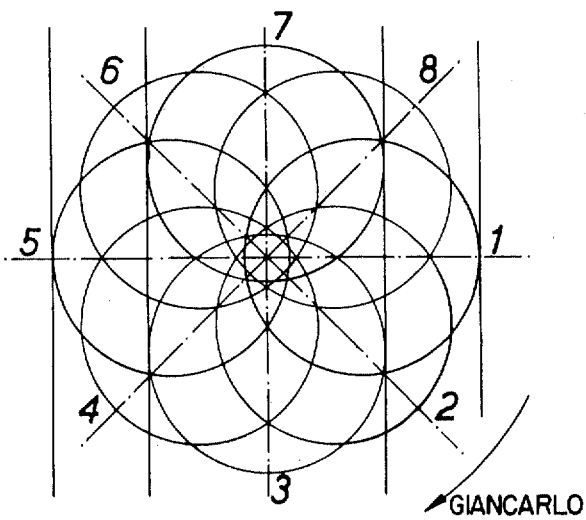
FIG. 2 is a diagram of the paths or loci of the points of the oscillator unit during motion.

For a better understanding of the operation of this drive system, reference may be had to the diagram of FIG. 2, wherein the eight sequential positions of the eccentric during one complete revolution of the drive shaft are illustrated.

In the operation of the drive system, electric motor 100 (FIG. 15) rotates drive shaft 104 and eccentric 201 to oscillate swinging plate 203 from side to side. The clockwise rotation of the eccentric from position 1 to position 5 (FIG. 2) results in leftward movement of swinging plate 203, as viewed in FIG. 1. Thereafter, continued clockwise rotation of the eccentric from position 5 to position 1 results in rightward movement of the swinging plate.

Referring to FIG. 2, when eccentric 201 is in position 1, swinging plate 203 is located in its extreme right end position. As the eccentric is rotated toward position 2, swinging plate 203 is accelerated leftward. The swinging plate is further accelerated to the left as the eccentric moves from position 2 to position 3 and, when the eccentric arrives at position 3, the swinging plate is at its maximum leftward velocity.

As eccentric 201 moves between positions 3 and 4, swinging plate 203 continues its leftward movement and is decelerated. The swinging plate is further decelerated as the eccentric moves from position 4 to position 5 and, when the eccentric arrives at position 5, the velocity of the swinging plate is reduced to zero magnitude. At this point swinging plate 203 is located in it s extreme left end position.

When the eccentric moves from position 5 to position 6, swinging plate 203 is accelerated to the right. The swinging plate is further accelerated during movement of the eccentric from position 6 to position 7 and, when the eccentric arrives at position 7, the swinging plate is at its maximum rightward velocity.

As the eccentric moves between positions 7 and 8, swinging plate 203 continues its leftward movement and is decelerated. Finally, when the eccentric moves from position 8 to position 1, plate 203 is further decelerated and, when the eccentric returns to position 1, the velocity of swinging plate is reduced to zero magnitude.

One can therefore conclude that when eccentric is passing through the positions 3 and 7, swinging plate 203 does not receive any thrust and stops, at the positions 2 and 4 it is dragged to the left and at the positions 6 and 8 it is dragged to the right.

The oscillator unit, on which the shaving elements are mounted, in the drive system of the present invention consists of an articulated parallelogram, comprising four pairs of pins connected in a closed arrangement.

The drive system comprises four pairs of pins with parallel axes connected by four arms (members) so as to form an articulated quadrilateral and since the opposite members are equal, the system is an articulated parallelogram. The parallelogram is articulated because it is provided with joints at each of its corners.

Figure 1:
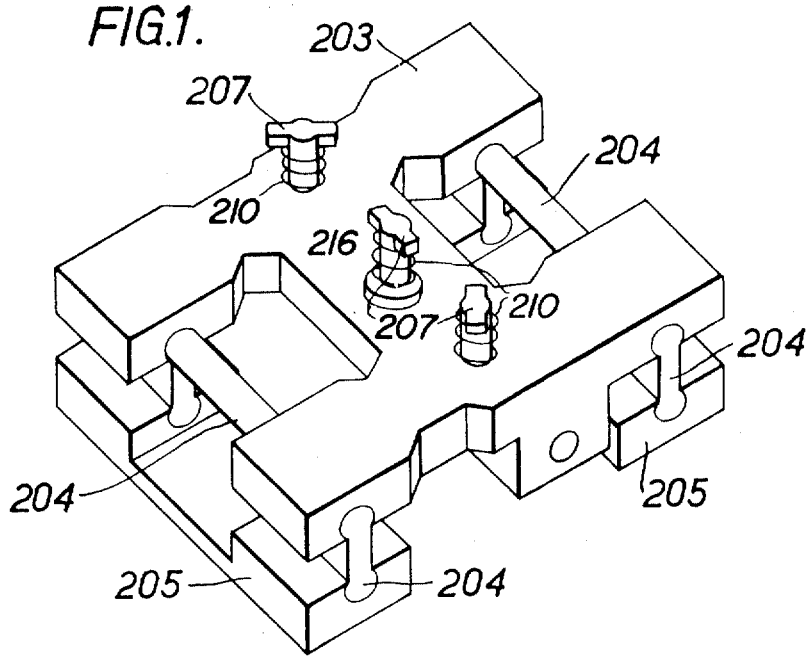
FIG. 1 is an isometric view of the whole drive system.

The parallelogram is comprised of a swinging plate 203, two swinging arms 204 and two supporting plates 205 (FIG. 1). Swinging plate 203 and swinging arms 204 comprise the oscillator unit of the present invention. The swinging plate 203 is generally H-shaped and has three holes 206 on its central portion, in which the T-shaped pins 207 for connecting shaving elements 105 (FIG. 15) are received. Near the ends of the two flanges of the H-shaped plate 203, on its underside, there are two circular bores or grooves 208 on each side, in which are rotating with a close sliding fit the two lateral swinging arms 204, which are also received at the opposite side in like circular bores or grooves 209, provided in the supporting plates 205.

As shown in FIG. 15, supporting plates 205 can be mounted on housing 102 of the shaver by conventional mounting means, e.g., a shoulder formed on the housing.

Figure 3:
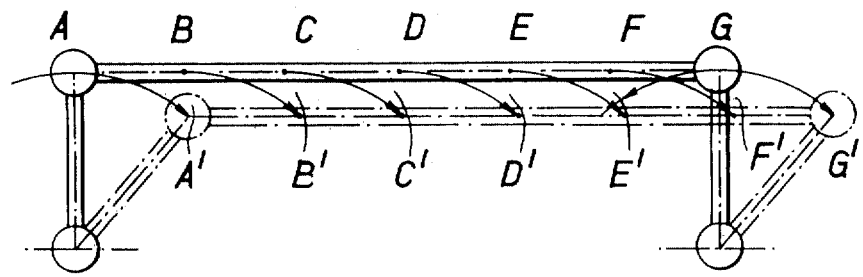
FIG. 3 is a schematic view of a motion stage to the right illustrating the paths of different points of the swinging plate during such a stage.

Taking into account that the parallelogram members are rigid and that the movements are as above indicated, it results that each point of the oscillator, during a complete revolution of the drive shaft of the electric motor, follows a circular path. As shown in FIG. 3, points A and G, which are located on the oscillator unit at opposite ends of the swinging plate, move along circular paths A–A' and G–G', respectively, during the operation of the oscillator unit. Similarly, points B, C, D, E, and F on the swinging plate move along circular paths B–B', C–C', D–D', E–E', and F–F', respectively, during oscillation of the unit.

In order to better understand the movements, it has to be pointed out that eccentricity is 1.5 and the two lateral swinging arms are very short.

The upward thrust of the oscillator unit could impair the shaving operation, so that on the stems of the T-shaped pins 207 mounting the shaving elements, there are springs 210 for continuously urging the shaving elements away from swinging plate 203 and assuring a constant contact between shaving elements and comb (not shown).

Although the drive system of the present invention could be used with any kind of comb and blade shaving elements, it is particularly adapted to control the motion of the shaving elements disclosed in copending U.S. application Ser. No. 805,170 of the same applicant and filed on Mar. 7, 1969, entitled: "Shaving Unit for Electric Shaver."

Figure 5:
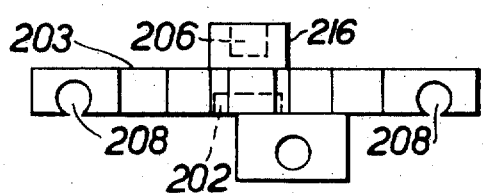
FIG. 5 is a side view of the same plate.

The two (2) outer T-shaped pins 207 have the lower stem forced into the holes 206 formed in the swinging plate 203, and the central pin 207 is forced into a hole 206 formed in a projection 216 (FIGS. 1, 4, and 5) mounted on upper surface swinging plate 203. The upper flange of the central pin is oriented toward the short sides of the plate, and the upper flange of the lateral pins is oriented at 45° (see FIG. 1). With such starting arrangement of the T-shaped pins, the mounting operation of the shaving elements takes place according to the following sequential steps:

(a) the central shaving element is placed close to the central T-shaped connecting pin, its longitudinal axis is being oriented toward the short sides of the swinging plate and once threaded on the pin, it is turned 45°;

(b) a lateral shaving element is now threaded on the corresponding pin, taking into account the 45° inclination of the key hole;

(c) the two already mounted shaving elements are turned 90° and the third shaving element is threaded on the pin;

(d) all the three shaving elements are turned 45° so that they are now all in their operative position, with the longitudinal axis parallel to the long side of the swinging plate.

It is to be understood that many variations and modifications may be made to the components and features of the drive system of the present invention, however without departing from spirit and scope thereof as defined in the appended claims.

I claim:

1. A drive system in an electric shaver for transmitting motion from an electric motor to the shaving elements of the electric shaver, comprising:
   a mechanical oscillator unit including a plate coupled to the shaving elements and a plurality of parallel arms pivotally supported at first ends thereof and pivotally connected at opposite ends thereof to said plate to support said plate for oscillating movement, said plate and said plurality of arms providing an articulated parallelogram for supporting the shaving elements; and
   drive means for imparting oscillating movement to said plate to drive the shaving elements.

2. The drive system of claim 1, wherein said drive means comprises:
   an eccentric cam driven by the electric motor and operatively connected to said plate for imparting oscillating movement to said plate to drive the shaving elements.

3. The drive system of claim 2, wherein said plate includes a recess in the form of a hollow parallelepiped centrally located in said plate for receiving said eccentric cam to convert rotary motion of the electric motor into oscillating motion of said plate and shaving elements.

4. The drive system of claim 1, wherein the shaving elements are mounted on said plate by connecting pins, said pins having springs wound thereon for continuously urging the shaving elements away from said plate.

5. The drive system of claim 4, wherein said connecting pins are T-shaped and have upper flanges to be received in corresponding key holes formed in the bottom portions of the shaving elements for mounting the shaving elements on said plate.

References Cited
UNITED STATES PATENTS

| | | | |
|---|---|---|---|
| 2,327,363 | 3/1943 | Mehl | 30—43.3 |
| 3,172,201 | 3/1965 | Messinger et al. | 30—43.92 |

FOREIGN PATENTS

| | | | |
|---|---|---|---|
| 519,096 | 3/1940 | Great Britain | 30—43.3 |

GRANVILLE Y. CUSTER, Jr., Primary Examiner